(12) United States Patent
Fletcher et al.

(10) Patent No.: US 7,745,500 B2
(45) Date of Patent: Jun. 29, 2010

(54) METHOD FOR REDUCING THE VISCOSITY OF VISCOUS FLUIDS

(75) Inventors: Philip Fletcher, Cambridgeshire (GB); Michael John Crabtree, Tyne & Wear (GB); Donald Eagland, West Yorkshire (GB); Nicholas John Crowther, West Yorkshire (GB)

(73) Assignee: Advanced Gel Technology Limited, West Yorkshire (GB)

( * ) Notice: Subject to any disclaimer, the term of this patent is extended or adjusted under 35 U.S.C. 154(b) by 441 days.

(21) Appl. No.: 10/574,232

(22) PCT Filed: Sep. 27, 2004

(86) PCT No.: PCT/GB2004/004083

§ 371 (c)(1),
(2), (4) Date: Jul. 13, 2006

(87) PCT Pub. No.: WO2005/040669

PCT Pub. Date: May 6, 2005

(65) Prior Publication Data

US 2007/0042911 A1     Feb. 22, 2007

(30) Foreign Application Priority Data

Oct. 2, 2003 (GB) ............................ 0323067.9
Feb. 24, 2004 (GB) ............................ 0404051.5

(51) Int. Cl.
*C09K 3/00* (2006.01)
*C09K 8/60* (2006.01)

(52) U.S. Cl. ........................................ 516/113; 507/203
(58) Field of Classification Search ............... 516/113
See application file for complete search history.

(56) References Cited

U.S. PATENT DOCUMENTS

| 4,178,951 A * | 12/1979 | Sweeney ..................... 137/13 |
| 4,508,858 A | 4/1985 | Luetzelschwab |
| 4,559,202 A | 12/1985 | Luetzelschwab |
| 4,576,978 A | 3/1986 | Luetzelschwab |
| 4,603,154 A | 7/1986 | Luetzelschwab |
| 4,693,321 A | 9/1987 | Royer |
| 4,757,833 A | 7/1988 | Danley |
| 4,795,478 A | 1/1989 | Layrisse et al. |
| 4,896,723 A * | 1/1990 | Hoskin et al. ............ 166/272.3 |
| 4,934,398 A | 6/1990 | Chirinos et al. |
| 5,013,462 A | 5/1991 | Danley |
| 5,024,676 A | 6/1991 | Moriyama et al. |
| 5,411,558 A | 5/1995 | Taniguchi et al. |
| 5,437,696 A | 8/1995 | Verkade et al. |
| 5,551,956 A | 9/1996 | Moriyama et al. |
| 5,641,433 A * | 6/1997 | Chirinos et al. ................ 516/68 |
| 2002/0128374 A1* | 9/2002 | Eagland et al. ............. 524/503 |
| 2005/0049327 A1 | 3/2005 | Jovancicevic et al. |
| 2005/0085395 A1 | 4/2005 | Dikland et al. |
| 2005/0209368 A1 | 9/2005 | Yang et al. |

FOREIGN PATENT DOCUMENTS

| EP | 1 285 026 B1 | 1/2004 |
| WO | WO 98/12239 A1 | 3/1998 |
| WO | WO 2005/100517 A1 | 10/2005 |

OTHER PUBLICATIONS

US 5,772,706 (withdrawn).
Patent Abstracts of Japan, vol. 017, No. 554 (C-1118), Oct. 6, 1993 & JP 05 156208 A (Kuraray Co. Ltd.) Jun. 22, 1993 (abstract).
US 5,772,706, 06/1998, Schield et al. (withdrawn)

* cited by examiner

*Primary Examiner*—Ling-Siu Choi
*Assistant Examiner*—Chun-Cheng Wang
(74) *Attorney, Agent, or Firm*—Nixon & Vanderhye

(57) ABSTRACT

A viscous fluid, such as heavy crude oil which is too viscous to enable it to be pumped from a flowing phase of a reservoir into and along a pipeline for delivery to a refinery or other storage facility, may be contacted with a formulation to reduce its viscosity. The formulation comprises a polymeric material AA which includes —O— moieties pendent form a polymeric backbone thereof and said material is optionally cross-linked. In one embodiment, the formulation may comprise polyvinyl alcohol. In an alternative embodiment, the formulation may comprise a cross-linked polymeric material, such as cross-linked polyvinyl alcohol. After the viscous composition has been transported to a desired location, it may be separated from the other components.

32 Claims, 1 Drawing Sheet

METHOD FOR REDUCING THE VISCOSITY OF VISCOUS FLUIDS

Figure 1:
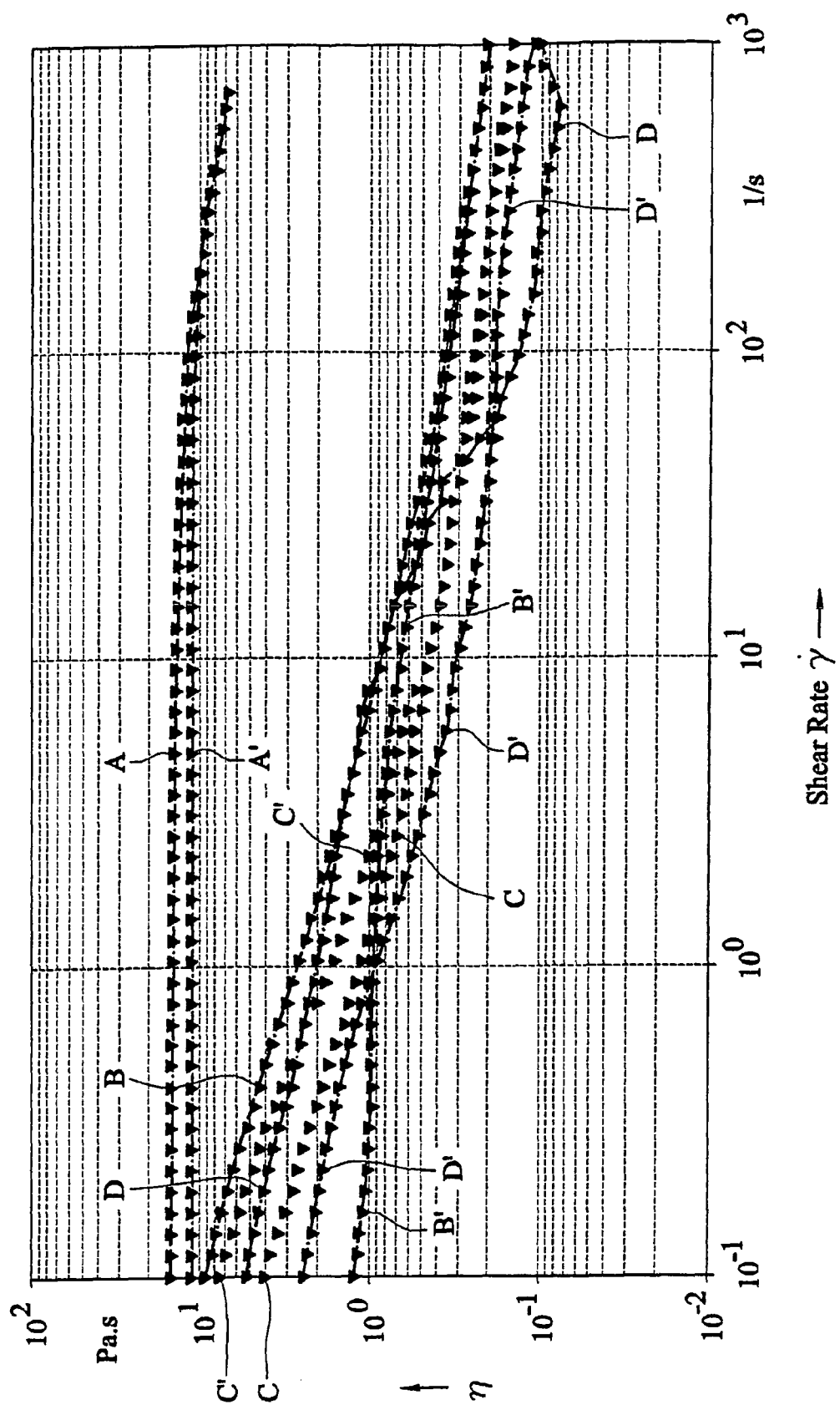

This application is the U.S. National Phase of International Application PCT/GB2004/004083, filed 27 Sep. 2004, which designated the U.S. PCT/GB2004/004083 claims priority to British Application No. 0323067.9 filed 2 Oct. 2003 and 0404051.5 filed 24 Feb. 2004. The entire content of these applications are incorporated herein by reference.

This invention relates to viscous fluids and particularly, although not exclusively, relates to the reduction of the viscosity of viscous fluids to facilitate their flow between two locations. Preferred embodiments relate to the reduction of the viscosity of viscous petroleum to facilitate its transport between a place where it is produced and a point downstream thereof.

There are many known petroleum-containing formations from which very little petroleum can be obtained by normal production techniques because the petroleum viscosity is so high that the petroleum will not flow at formation conditions even if a substantial pressure differential, either natural or artificially induced as by injecting water or other fluids into the formation, is applied to the petroleum. These petroleum formations are sometimes referred to as heavy oil formations, and for the purpose of this disclosure, by heavy oil or viscous petroleum it is meant crude petroleum having an API gravity less than about 25° API at 75° F.

Various techniques have been disclosed for stimulating the recovery of viscous petroleum or heavy oil and facilitating its transport along pipelines from a production facility to a refinery. However, there still exists a problem, especially where the petroleum is extremely viscous such as that found in heavy oil reservoirs or tar sand deposits.

It is an object of the present invention to address problems associated with the flow and/or transport of viscous fluids.

According to a first aspect of the invention, there is provided a method of reducing the viscosity of a viscous composition which is arranged to flow along a fluid flow path, said method comprising contacting the viscous composition with a treatment fluid formulation, said treatment fluid formulation comprising a polymeric material AA which includes —O— moieties pendent from a polymeric backbone thereof, wherein polymeric material AA is optionally cross-linked.

The ratio of the viscosity of the viscous composition immediately prior to contact with the treatment fluid formulation to the viscosity after contact with the treatment fluid formulation is preferably at least 1.2, more preferably at least 1.5.

The viscosity of the viscous composition after contact with the treatment fluid formulation is preferably less than 300 cP, more preferably less than 200 cP, especially less than 100 cP measured at 25° C. and 1000 $s^{-1}$ more preferably when measured at 100 $s^{-1}$.

The viscosity of the viscous composition after contact with the treatment fluid formulation is preferably less than 4000 cP for all shear rates in the range 20-1000 $s^{-1}$.

The viscous composition after contact with the treatment fluid formulation preferably exhibits shear thinning—i.e. the viscosity preferably falls as the shear rate increases. This may advantageously improve the mobility of the viscous composition. Said viscous composition may exhibit shear thinning as aforesaid at least over the shear rate range 0.1 to 100 $s^{-1}$. The shear thinning property may facilitate the re-commencement of flow of the viscous composition after flow in the fluid path has been stopped, for any reason. Advantageously, even if the viscous composition separates from parts of the treatment fluid formulation, for example during suspension of flow along the fluid flow path, on commencement of flow, the viscous composition and treatment fluid formulation may again become intimately mixed and the viscosity may be reduced as described.

The method may be used to reduce the viscosity of many types of viscous compositions provided that the viscous compositions can be caused to form a dispersion when contacted with said treatment fluid formulation. Said viscous composition is preferably organic. It is preferably a viscous fluid. It is preferably an oil. It preferably comprises petroleum. It preferably comprises a viscous petroleum.

Said viscous composition may be derived from a heavy oil reservoir and/or from tar sand deposits. It may be derived from a deep well wherein the composition may be sufficiently warm down the well to enable it to flow; but the viscosity rises as the composition is withdrawn from the well (and cools) making it more difficult to flow.

Said treatment fluid formulation preferably comprises a hydrogel.

Said treatment fluid formulation is preferably not injected into an injection well of a subterranean formation in order to contact said viscous composition.

Said treatment fluid formulation is preferably initially contacted with said viscous composition at or downstream of a production means, for example at or downstream of a producing face of a subterranean formation. In one embodiment, said treatment fluid formulation may be initially contacted with said viscous composition below ground (for example at or adjacent to a producing face of a subterranean formation) to reduce the viscosity of said viscous composition below ground and facilitate its transport to the surface. In another embodiment, said treatment fluid formulation may be contacted with said viscous composition at or adjacent the surface of the ground after the viscous composition has been transported to the surface, for example using heavy pumps.

Said treatment fluid formulation is preferably not used to drive the viscous composition through a subterranean formation.

Said fluid flow path is preferably defined by a conduit means.

Said conduit means preferably includes a first conduit part (e.g. a pipeline) which is arranged downstream of a production means, preferably above ground level. Said first conduit part preferably contains said viscous composition after contact with the treatment fluid formulation.

Said first conduit part may be circular in cross-section. Said part may have a cross-sectional area for at least part of its length of at least 5 cm, preferably at least 10 cm. In some cases, the cross-section may have a diameter of up to 0.5 m. Said first conduit part preferably extends away from a position where the viscous composition is produced, suitably in a transverse direction to the vertical. Said first conduit part may have a length of at least 5 m, preferably at least 20 m, especially at least 100 m. In some cases, said first conduit part may have a length of more than 1,000 m, more than 5,000 m, more than 10,000 m, even more than 500 km. Long pipes may be arranged to deliver petroleum to a refinery; such pipes may extend partly above and partly below ground.

Said fluid flow path (e.g. said conduit means) may extend between a first point, remote from the point of production of the viscous composition, and a second point closer to, for example at or adjacent to, the point of production of the viscous composition. Said first point may be above ground and may be, for example, a refinery; said second point may be closer to the producing face of a subterranean formation. It may be at or adjacent to the producing face.

Said fluid flow path may be defined, in part, by a second conduit part which extends upwardly from below ground to above ground. Said second conduit part may be a riser pipe. Said second conduit part may contain said viscous composition after contact with the treatment fluid formulation.

Said treatment fluid formulation is preferably arranged to disperse and/or emulsify said viscous composition on contact therewith. Said viscous composition may not be substantially particulate prior to contact with said treatment fluid formulation—it may be in the form of a substantially homogenous fluidic mass. Preferably, flow along said fluid flow path is turbulent, at least in part, thereby to facilitate formation of said dispersion and/or emulsion. Preferably, flow is turbulent at the point of initial contact of said viscous composition with said treatment fluid formulation so that said composition is dispersed and/or emulsified on contact with said formulation.

In the method, a delivery flow path is preferably defined which is arranged to communicate with said fluid flow path wherein said treatment fluid formulation is dosed into said viscous composition in said fluid flow path via said delivery flow path. Said delivery flow path preferably communicates with said fluid flow path at or downstream of a producing face of the subterranean formation.

The ratio of the flow rate (in weight per unit time) of treatment fluid formulation in said delivery flow path to the flow rate (in the same units) of viscous composition in said fluid flow path may be in the range 0.1 to 2.5, preferably in the range 0.2 to 1, more preferably in the range 0.4 to 0.8, especially in the range 0.6 to 0.7.

The mass fraction of viscous composition in said fluid flow path after contact with said treatment fluid formulation is preferably in the range 0.4 to 0.8.

Preferably, immediately after contact between said viscous composition and said treatment fluid formulation, the composition in said fluid flow path includes 30 to 80 wt % (preferably 40 to 80 wt %, more preferably 50 to 70 wt %) of material derived from said viscous composition and 20 to 70 wt %, (preferably 20 to 60 wt %, more preferably 30 to 50 wt %, especially 30 to 45 wt %) of material derived from said treatment fluid formulation.

Suitably, immediately after contact between said viscous composition and said treatment fluid formulation, the composition in said fluid flow path includes at least 20 wt %, preferably at least 25 wt %, more preferably at least 30 wt %, water; and at least 40 wt %, preferably at least 50 wt %, more preferably at least 55 wt % of said viscous composition, especially of oil.

The amount of water in the composition in said fluid flow path immediately after contact between said viscous composition and said treatment fluid formulation is preferably less than 70 wt %, more preferably less than 60 wt %, especially less than 50 wt %, more preferably 40 wt % or less. The amount of water may be in the range 20 to 50 wt %.

Said treatment fluid formulation suitably has a viscosity at 25° C. and 1000 s$^{-1}$ of greater than 1 cP, preferably greater than 2 cP. Said treatment fluid formulation preferably has a viscosity under the conditions described of not greater than 50 cP, preferably of 10 cP or less.

Said treatment fluid formulation is preferably aqueous. It may include at least 70 wt %, preferably at least 80 wt %, more preferably at least 90 wt %, especially at least 95 wt % water. The amount of water may be less than 99.6 wt %. Said treatment fluid formulation preferably includes 90 to 99.6 wt % water.

Said treatment fluid formulation suitably includes at least 0.2 wt %, preferably at least 0.4 wt %, especially at least 0.5 wt % of said polymeric material AA. Said formulation preferably includes less than 10 wt %, more preferably less than 8 wt %, especially less than 5.5 wt % of said polymeric material AA.

In a preferred embodiment, said treatment fluid formulation includes 94.5 to 99.6 wt % water and 0.4 to 5.5. wt % of said polymeric material AA; and the ratio of the wt % of said treatment fluid formulation to the wt % of said viscous composition contacted in the method is in the range 0.4 to 0.9.

Water for use in the treatment fluid formulation may be derived from any convenient source. It may be potable water, surface water, sea water, aquifer water, deionised production water and filtered water derived from any of the aforementioned sources. The water may be treated so that it is suitable for use in the method. For example, it may be treated by addition of oxygen scavengers, biocides, corrosion inhibitors, scale inhibitors, anti-foaming agents and flow improvers. Sea water and/or water from other sources may be deoxygenated and/or desulphonated.

Said polymeric material AA is preferably soluble in water at 25° C. Preferably, when said polymeric material AA is not cross-linked, polymeric material AA in said treatment fluid formulation is wholly or partially dissolved therein to define a solution or dispersion.

Whilst the applicant does not wish to be bound by any theory, said optionally cross-linked polymeric material AA may be arranged to coat particles of the viscous composition, whereby the coated particles may then be more easily dispersed compared to uncoated particles such as oil. Said polymeric material AA may be arranged to be absorbed onto the viscous composition, for example oil, to enable said particles to form. Said polymeric material AA is preferably not a conventional surfactant having a hydrophobic portion, for example a hydrophobic tail and a hydrophilic portion, for example an ionic head. Thus, it is believed that formation of said coated particles preferably does not involve a hydrophobic tail part interacting with, for example oil, and a hydrophilic part interacting with, for example water. According to the applicant's theory, the polymeric material AA may form "balls" made up of "threads" of the polymeric material. It is believed that a multiplicity of such balls associate with the surface of oil droplets formed in the method, to surround the droplets and thereby stabilise them. When the polymeric material AA is cross-linked the cross-links may formalise the shape of the balls and make them robust.

Said polymeric backbone of polymeric material AA preferably includes carbon atoms. Said carbon atoms are preferably part of —$CH_2$— moieties. Preferably, a repeat unit of said polymeric backbone includes carbon to carbon bonds, preferably C—C single bonds. Preferably, said polymeric material AA includes a repeat unit which includes a —$CH_2$— moiety. Preferably, said polymeric backbone does not include any —O— moieties, for examples —C—O— moieties such as are found in an alkyleneoxy polymer, such as polyethyleneglycol. Said polymeric backbone is preferably not defined by an aromatic moiety such as a phenyl moiety such as is found in polyethersulphones. Said polymeric backbone preferably does not include any —S— moieties. Said polymeric backbone preferably does not include any nitrogen atoms. Said polymeric backbone preferably consists essentially of carbon atoms, preferably in the form of C—C single bonds.

Said treatment fluid formulation may include a hydrogel which may be an optionally cross-linked polysaccharide, polyvinylalcohol or polyvinylacetate.

Said —O— moieties are preferably directly bonded to the polymeric backbone.

Said polymeric material AA preferably includes, on average, at least 10, more preferably at least 50, —O— moieties pendent from the polymeric backbone thereof.

Said —O— moieties are preferably a part of a repeat unit of said polymeric material AA.

Preferably, said —O— moieties are directly bonded to a carbon atom in said polymeric backbone of polymeric material AA, suitably so that said polymeric material AA includes a moiety (which is preferably part of a repeat unit) of formula:

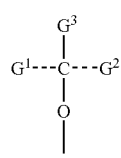

II where $G^1$ and $G^2$ are other parts of the polymeric backbone and $G^3$ is another moiety pendent from the polymeric backbone. Preferably, $G^3$ represents a hydrogen atom.

Preferably, said polymeric material AA includes a moiety

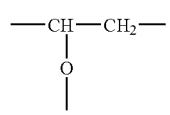

III

Said moiety III is preferably part of a repeat unit. Said moiety III may be part of a copolymer which includes a repeat unit which includes a moiety of a different type compared to moiety III. Suitably, at least 60 mole %, preferably at least 80 mole %, more preferably at least 90 mole % of polymeric material AA comprises repeat units which comprise (preferably consists of) moieties III. Preferably, said polymeric material AA consists essentially of repeat units which comprise (preferably consist of) moieties III.

Suitably, 60 mole %, preferably 80 mole %, more preferably 90 mole %, especially substantially all of said polymeric material AA comprises vinyl moieties which are optionally cross-linked.

Preferably, the free bond to the oxygen atom in the —O— moiety pendent from the polymeric backbone of polymeric material AA (and preferably also in moieties II and III) is bonded to a group $R^{10}$ (so that the moiety pendent from the polymeric backbone of polymeric material AA is of formula —O—$R^{10}$). Preferably group $R^{10}$ comprises fewer than 10, more preferably fewer than 5, especially 3 or fewer carbon atoms. It preferably only includes atoms selected from carbon, hydrogen and oxygen atoms. $R^{10}$ is preferably selected from a hydrogen atom and an alkylcarbonyl, especially a methylcarbonyl group. Preferably moiety —O— $R^{10}$ in said polymeric material AA is an hydroxyl or acetate group.

Said polymeric material AA may include a plurality, preferably a multiplicity, of functional groups (which incorporate the —O— moieties described) selected from hydroxyl and acetate groups. Said polymeric material AA preferably includes a multiplicity of hydroxyl groups pendent from said polymeric backbone. Said polymeric material AA preferably includes a multiplicity of acetate groups pendent from the polymeric backbone.

Preferably, each free bond to the oxygen atoms in —O— moieties pendent from the polymeric backbone in polymeric material AA, except for any free bonds which are involved in cross-linking the polymeric material AA, is of formula —O—$R^{10}$ wherein each group —O$R^{10}$ is selected from hydroxyl and acetate.

Preferably, said polymeric material AA includes a vinyl alcohol moiety, especially a vinyl alcohol repeat unit. Said polymeric material AA preferably includes a vinyl acetate moiety, especially a vinylacetate repeat unit. Polyvinylalcohol is generally made by hydrolysis of polyvinylacetate. Said polymeric material AA may comprise a 0-100% hydrolysed, preferably a 5 to 95% hydrolysed, more preferably a 60 to 90 wt %, especially a 70 to 85 wt % hydrolysed polyvinylacetate Said polymeric material AA may have a number average molecular weight (Mn) of at least 10,000, preferably at least 50,000, especially at least 75,000. Mn may be less than 500,000, preferably less than 400,000. Said polymeric material AA is preferably a polyvinyl polymer. Said polymeric material AA may be a copolymer.

Said polymeric material AA is preferably a polyvinyl alcohol polymer or copolymer.

Preferably, said polymeric material AA includes at least one vinyl alcohol/vinyl acetate copolymer which may include greater than 5%, suitably includes greater than 30 wt %, preferably greater than 65%, more preferably greater than 80 wt % of vinyl alcohol moieties.

Said polymeric material AA may be a random or block copolymer.

As described above, polymeric material AA is optionally cross-linked. A cross-linked material may be used in the method when the chemical or physical conditions to which the treatment fluid formulation may be subjected during the reduction in viscosity of the viscous composition and/or during flow in a conduit means, for example in said first conduit part (when provided) as described above, may be relatively harsh. In many applications, it is not be necessary to cross-link polymeric material AA.

A cross-linked material as described is preferably a hydrogel. Such a hydrogel may be selected from a cross-linked natural or synthetic polysaccharide, polyvinylalcohol or polyvinylacetate.

When a cross-linked material is used in the method, said method preferably comprises selecting a said polymeric material AA; selecting a material BB which includes a functional group which is able to react in the presence of is said polymeric material AA to cross-link polymeric material AA and form a polymeric material CC; and causing the formation of said polymeric material CC by a reaction involving said polymeric material AA and material BB.

The ratio of the wt % of said material BB to the wt % of said polymeric material AA selected for preparation of said polymeric material CC is suitably less than 0.15, preferably less than 0.10, more preferably less than 0.05, especially less than 0.035. Said ratio may be at least 0.005, preferably at least 0.01, more preferably at least 0.015, especially at least 0.02.

The sum of the wt % of the polymeric material AA and material BB selected for preparation of said polymeric material CC may be at least 0.4 wt %. The sum may be less than 5 wt %, preferably less than 4 wt %, more preferably less than 3 wt %, especially less than 2.5 wt %.

Suitably, the amounts of "polymeric material AA" and "material BB" described refer to the sum of the amounts of polymeric materials AA (if more than one type is provided) and the sum of the amounts of materials BB (if more than one type is provided).

Preferably, formation of said polymeric material CC from said polymeric material AA and material BB involves a condensation reaction. Preferably, formation of said polymeric material CC involves an acid catalysed reaction. Preferably, said polymeric material AA and material BB include functional groups which are arranged to react, for example to undergo a condensation reaction, thereby to form said polymeric material CC. Preferably, said polymeric material AA and material BB include functional groups which are arranged to react for example to undergo an acid catalysed reaction thereby to form said polymeric material CC.

Said material BB may be an aldehyde, carboxylic acid, urea, acroleine, isocyanate, vinyl sulphate or vinyl chloride of a diacid or include any functional group capable of condensing with one or more groups on said polymeric material AA. Examples of the aforementioned include formaldehyde, acetaldehyde, glyoxal and glutaraldehyde, as well as maleic acid, oxalic acid, dimethylurea, polyacroleines, diisocyanates, divinyl sulphate and the chlorides of diacids.

Said material BB is preferably an aldehyde containing or generating compound. Preferably, material BB is an aldehyde containing compound.

Material BB may include one or more aldehyde groups. Whilst it could be a monoaldehyde such as formaldehyde it preferably includes a plurality of aldehyde groups.

Material BB may have a general formula

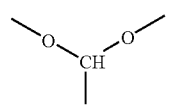

where $G^5$ represents a direct link or a linking moiety.

$G^5$ may be arranged to space apart the —CHO groups thereby to affect the spacing of the cross-linking of polymeric material AA.

In one embodiment, group $G^5$ may be a —$(CH_2)_y$— moiety wherein y represents 0 to 8, and one or more of the H atoms may be replaced by (but preferably are not replaced by) another atom or group. Preferably, y represents 0 to 6, more preferably 0 to 4, especially 0 to 2.

Group $G^5$ may be arranged to introduce some rigidity into the cross-linking of polymeric material AA. For example, group $G^5$ may include at least some covalent bonds which are not freely rotatable. For example, group $G^5$ preferably does not consist exclusively of a —$CH_2$— chain wherein each carbon-carbon bond will be freely rotatable but preferably includes an atom or group or other means which restricts free rotation compared to a case wherein $G^5$ consists of a —$CH_2$— chain. For example $G^5$ may incorporate bulky atoms or groups; and/or unsaturated atoms or groups; and/or atoms or groups which hinder free rotation due to electronic effects.

Group $G^5$ may include at least 1, preferably at least 2, more preferably at least 3, especially at least 4, carbon atoms in a chain extending between the two —CHO groups.

In one embodiment, group $G^5$ incorporates one or more aromatic or heteroaromatic groups. Such groups may be arranged to restrict rotation as described. Preferred heteroaromatic groups include N-containing heteroaromatic groups. Preferred aromatic and heteroaromatic groups are selected from optionally-substituted phenyl and N-containing aromatic groups, such as pyridinyl groups.

Group $G^5$ preferably includes both an aromatic and N-containing heteroaromatic group.

Group $G^5$ preferably includes some charge separation. It preferably includes a polar group. It preferably includes a cationic group. A preferred cationic group is one which includes a $N^+$ moiety.

Group $G^5$ may itself include one or more aldehyde (or other) functional groups.

Said polymeric material CC may include a moiety

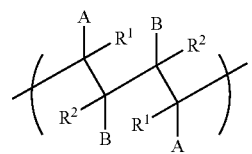

IV wherein the free bonds of the oxygen atoms are bonded to the polymeric backbone and the free bond of the carbon atom is bonded to a residue of the material BB. The residue of material BB may also be bonded to the polymeric backbone of another polymeric chain (for example of a polymeric material AA as described), thereby to cross-link polymeric material AA.

Said material BB may comprise:
(i) a first polymeric material having a repeat unit of formula

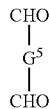

I wherein A and B are the same or different, are selected from optionally-substituted aromatic and heteroaromatic groups and at least one comprises a relatively polar atom or group and $R^1$ and $R^2$ independently comprise relatively non-polar atoms or groups; or
(ii) a first polymeric material prepared or preparable by providing a compound of general formula

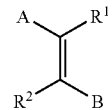

wherein A, B, $R^1$ and $R^2$ are as described above, in an aqueous solvent and causing the groups C═C in said compound to react with one another to form said first polymeric material.

In the first polymeric material described above, A and/or B could be multi-cyclic aromatic or heteroaromatic groups. Preferably, A and B are independently selected from optionally-substituted five or more preferably six-membered aromatic and heteroaromatic groups. Preferred heteroatoms of said heteroaromatic groups include nitrogen, oxygen and sulphur atoms of which oxygen and especially nitrogen, are preferred. Preferred heteroaromatic groups include only one heteroatom. Preferably, a or said heteroatom is positioned furthest away from the position of attachment of the heteroaromatic group to the polymer backbone. For example, where the heteroaromatic group comprises a six-membered ring, the heteroatom is preferably provided at the 4-position relative to the position of the bond of the ring with the polymeric backbone.

Preferably, A and B represent different groups. Preferably, one of A or B represents an optionally-substituted aromatic group and the other one represents an optionally-substituted heteroaromatic group. Preferably A represents an optionally-substituted aromatic group and B represents an optionally-substituted heteroaromatic group especially one including a nitrogen heteroatom such as a pyridinyl group.

Unless otherwise stated, optionally-substituted groups described herein, for example groups A and B, may be substituted by halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, up to 3, more preferably up to 1 optional substituents may be provided on an optionally substituted group.

Unless otherwise stated, an alkyl group may have up to 10, preferably up to 6, more preferably up to 4 carbon atoms, with methyl and ethyl groups being especially preferred.

Preferably, A and B each represent polar atoms or group—that is, there is preferably some charge separation in groups A and B and/or groups A and B do not include carbon and hydrogen atoms only.

Preferably, at least one of A or B includes a functional group which can undergo a condensation reaction, for example on reaction with said polymeric material AA. Preferably, A includes a said functional group which can undergo a condensation reaction.

Preferably, one of groups A and B includes an optional substituent which includes a carbonyl or acetal group with a formyl group being especially preferred. The other one of groups A and B may include an optional substituent which is an alkyl group, with an optionally substituted, preferably unsubstituted, $C_{1-4}$ alkyl group, for example a methyl group, being especially preferred.

Preferably, A represents a group, for example an aromatic group, especially a phenyl group, substituted (preferably at the 4-position relative to polymeric backbone when A represents an optionally-substituted phenyl group) by a formyl group or a group of general formula

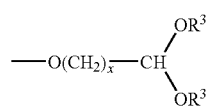

II where x is an integer from 1 to 6 and each $R^3$ is independently an alkyl or phenyl group or together form an alkalene group.

Preferably, B represents an optionally-substituted heteroaromatic group, especially a nitrogen-containing heteroaromatic group, substituted on the heteroatom with a hydrogen atom or an alkyl or aralkyl group. More preferably, B represents a group of general formula

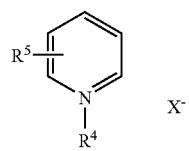

III wherein $R^4$ represents a hydrogen atom or an alkyl or aralkyl group, $R^5$ represents a hydrogen atom or an alkyl group and $X^-$ represents a strongly acidic ion;

Preferably, $R^1$ and $R^2$ are independently selected from a hydrogen atom or an optionally-substituted, preferably unsubstituted, alkyl group. Preferably, $R^1$ and $R^2$ represent the same atom or group. Preferably, $R^1$ and $R^2$ represent a hydrogen atom.

Preferred first polymeric materials may be prepared from any of the compounds described on page 3 line 8 to line 39 of GB2030575B by the method described in WO98/12239 and the contents of the aforementioned documents are incorporated herein by reference.

Said first polymeric material may be of formula

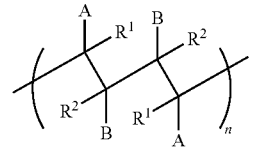

wherein A, B, $R^1$ and $R^2$ are as described above and n is an integer. Integer n is suitably 10 or less, preferably 8 or less, more preferably 6 or less, especially 5 or less. Integer n is suitably at least 1, preferably at least 2, more preferably at least 3.

Said polymeric material CC suitably includes a moiety of formula

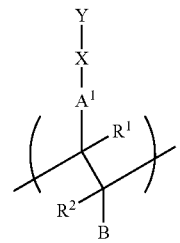

wherein $R^1$, $R^2$ and B are as described above, $A^1$ represents a residue of group A described above after the reaction involving said first polymeric material and polymeric material AA, Y represents a residue of said polymeric material AA after said reaction involving said first polymeric material and polymeric material AA and X represents a linking atom or group extending between the residues of said first polymeric material and said polymeric material AA. In one preferred embodiment $A^1$ represents an optionally-substituted phenyl group, X represents a group

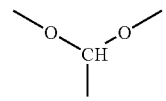

which is bonded via the oxygen atoms to a residue of said polymeric material AA. For example, group X may be bonded to the polymeric backbone of said polymeric material AA.

When said treatment fluid formulation comprises a polymeric material AA which is cross-linked, preferably, prior to the treatment fluid formulation contacting the viscous composition, it has attained at least 70% of the maximum viscosity attainable for the formulation at the temperature at which it is to contact the viscous composition. Preferably, it has attained at least 80%, more preferably 90%, especially about 100% of its maximum viscosity. Thus, in an especially preferred embodiment, said polymeric material AA and material BB are substantially completely reacted to form said polymeric material CC prior to contact with said viscous composition.

After the viscous composition has been delivered to a desired location (for example a refinery) the viscous composition may be caused to separate from other components of the treatment fluid formulation. This may be achieved by simply reducing any mixing or turbulent movement of the mixture and allowing the viscous composition to settle out from the water and optionally cross-linked polymeric material AA (which may be substantially soluble in the water under the conditions of settling). The rate of setting may be increased by increasing the temperature of the viscous composition. Additionally, the viscous composition may be diluted with light oil or mechanical means may be used to encourage settling. In some cases, for example, when said polymeric material AA is cross-linked, it may settle out as described. In other cases, wherein polymeric material AA is cross-linked, the method of the first aspect may include the step of contacting the mixture with a breaker means arranged to break an aqueous emulsion of the viscous composition. When polymeric material CC comprises 1,2-diol linkages, the breaker means is preferably arranged to cleave 1,2-diol linkages. Said breaker means preferably comprises a periodate (e.g. sodium or potassium periodate) in water.

The method of the first aspect preferably includes the step of separating at least a part of the treatment fluid formulation from the viscous composition after the viscous composition has flowed along said fluid flow path. After separation, said viscous composition suitably includes less than 10 wt %, preferably less than 5 wt %, especially less than 2 wt % water. After separation said viscous composition suitably includes less than 2 wt %, preferably less than 1 wt %, more preferably less than 0.5 wt %, especially less than 0.2 wt %, of said optionally-cross-linked polymeric material AA.

When the method includes the separating step as described, the treatment fluid formulation which is separated from the viscous composition may be re-used to reduce the viscosity of further viscous composition. For example, the method may involve a continuous or semi-continuous process wherein treatment fluid formulation is contacted with viscous composition to reduce its viscosity; the mixture is then caused to flow downstream along a fluid flow path thereby to deliver the viscous composition to a desired location; the viscous composition and treatment fluid formulation are separated; the viscous composition is used and/or stored as required in said desired location; the treatment fluid formulation is delivered to a location thereby to contact further viscous composition upstream of said desired location; and the process is suitably repeated.

According to a second aspect of the present invention there is provided a method of preparing a treatment fluid formulation (e.g. for reducing the viscosity of a viscous composition) comprising:

contacting an optionally cross-linked polymeric material AA as described according to the first aspect with water.

Preferably, the polymeric material AA is dissolved in the water thereby to prepare an aqueous solution of said polymeric material AA. Preferably, the polymeric material AA is in the form of a solid prior to contact with water.

Preferably, at least 100 liters more preferably at least 1000 liters of said treatment fluid formulation is prepared.

When the treatment fluid formulation is cross-linked, the method may comprise: selecting a polymeric material AA (for example a polyvinylalcohol) and a material BB as described according to said first aspect; and causing the formation of a said polymeric material CC by a reaction involving said polymeric material AA and said material BB.

In the preparation of said polymeric material CC, a catalyst is preferably provided for catalysing the reaction of the polymeric material AA and said material BB. Said catalyst is preferably a protic acid. Said catalyst is preferably phosphoric acid. Advantageously, when the fluid flow path of the first aspect is defined by steel pipes the phosphoric acid may facilitate the formation of an anti-corrosive layer on the pipes.

The method is preferably carried out adjacent or close to an oil field, for examples within 1 mile of a production well thereof. The method is preferably carried out within 1 mile of an oil supply line which is arranged to transport oil between two locations.

According to a third aspect of the invention, there is provided a treatment fluid formulation comprising:

at least 95 wt % water 4 wt % or less of said polymeric material AA which has optionally been cross-linked as described above.

According to a fourth aspect of the invention, there is provided a method of reducing the viscosity of a viscous composition which is arranged to flow along a fluid flow path, said method comprising contacting the viscous composition with a treatment fluid formulation, wherein said treatment fluid formulation includes a polymeric material which:

(a) is arranged to associate with, for example absorb onto, said viscous composition, especially oil, in order to enable droplets of said viscous composition to be formed, and/or stablised; and/or (b) is arranged to form a coating (which may be discontinuous) around droplets of said viscous composition;

(c) is arranged to form a hydrogel which is able to stabilise droplets of said viscous composition, especially oil.

Preferably, said polymeric material in said treatment fluid formulation (which is preferably optionally cross-linked polymeric material AA described above) is arranged to form a material, for example a hydrogel which is arranged to associate with, for example coat, droplets of said viscous composition, especially oil, in order to enable the formulation of a dispersion comprising said droplets.

Preferably, said polymeric material has each of the effects described in (a), (b) and (c) of the fourth aspect.

According to a fifth aspect of the invention, there is provided a method of reducing the viscosity of a viscous composition which is arranged to flow along a fluid flow path, said method comprising contacting the viscous composition with a treatment fluid formulation which includes a hydrogel, for example of an optionally cross-linked polymeric material AA as described herein.

The invention extends to a receptacle containing at least 100 liters, preferably at least 200 liters, especially at least 1000 liters of a said treatment fluid formulation as described herein.

According to a sixth aspect of the invention, there is provided a fluid flow path, for example a conduit means (preferably having a cross-sectional diameter at least in part of at least 5 cm and a length of at least 5 m) which contains a fluid comprising petroleum, water and an optionally cross-linked polymeric material AA as described herein. Said polymeric material may be a hydrogel, preferably as described herein.

Any feature of any aspect of any invention or embodiment described herein may be combined with any feature of any aspect of any other invention or embodiment described herein mutatis mutandis.

Specific embodiments of the invention will now be described, by way of example, with reference to FIG. 1 which is a plot of viscosity vs. shear rate for various formulations.

In general terms, heavy crude oil (and associated material) which may be too viscous to enable it to be pumped from the flowing face of a reservoir into and along a pipeline, for example to a refinery or other storage facility, may be contacted with a formulation at any point where it is desirable to reduce the oil viscosity. In a first embodiment, the formulation may comprise polyvinyl alcohol which alone has been found to be capable advantageously of reducing the viscosity of crude oil thereby enabling it to flow. In a second embodiment, the formulation may comprise a cross-linked polymeric material, for example cross-linked polyvinyl alcohol. The material of the second embodiment may be more robust compared to that of the first embodiment and may therefore be used in more challenging situations.

After, the oil has been transported to a desired location it may be separated from the other components in the mixture by allowing it to settle; by increasing its temperature; by dilution with light oil; by mechanical separation such as centrifugation (or the like); or by treatment with a chemical means such as a breaker which is arranged to break down cross-linked polymeric material.

Further details on the process are provided below.

EXAMPLE 1

60 g of an aqueous solution comprising 0.5% by weight polyvinylalcohol (80-95% hydrolyzed) of molecular weight 110,000 was added to a screw-capped glass vessel. To this was added 40 g of a crude oil which had a viscosity between 5800 cP and 6500 cP at a shear rate of 1 reciprocal second. The glass vessel was capped and the mixture was agitated by hand-shaking for approximately 30 seconds.

The viscosity of the subsequent mixture was determined to be between 1200 cP and 1800 cP at a shear rate of 1 reciprocal second and less than 200 cP at 100 s$^{-1}$.

EXAMPLE 2

The procedure described in example 1 was followed with the exception that mixing was performed under high shear. The viscosity of the final mixture was observed to be in the range 1200 cP to 1800 cP at a shear rate of 1 reciprocal second and less than 200 cP at 100 s$^{-1}$.

EXAMPLE 3

Preparation of poly (1,4-di(4-(N-methylpyridinyl))-2,3-di(4-(1-formylphenyl)butylidene This was prepared as described in Example 1 of PCT/GB97/02529, the contents of which are incorporated herein by reference. In the method, an aqueous solution of greater than 1 wt % of 4-(4-formylphenylethenyl)-1-methylpyridinium methosulphonate (SbQ) is prepared by mixing the SbQ with water at ambient temperature. Under such conditions, the SbQ molecules form aggregates. The solution was then exposed to ultraviolet light. This results in a photochemical reaction between the carbon-carbon double bonds of adjacent 4-(4-formylphenylethenyl)-1-methylpyridinium methosulphate molecules (I) in the aggregate, producing a polymer, poly (1,4-di(4-(N-methylpyridinyl))-2,3-di(4-(1-formylphenyl)butylidene methosulphonate (II).

EXAMPLE 4

Preparation of Poly(vinylalcohol) Solution

A 10 wt % poly(vinylalcohol) solution was prepared by slowly stirring a known amount of water and adding a known amount of 88% hydrolysed poly(vinylalcohol) of molecular weight 300,000 to the stirred water. The suspension was stirred for 1 hour and, thereafter, the suspension was heated at a temperature of 60° C. until the suspended particles dissolved and the solution was clear. The solution was then allowed to cool to less than 5° C. and maintained at this temperature until used.

EXAMPLE 5

Preparation of Butylidene Polymer/Poly(vinylalcohol) Formulation 997.5 g of the poly(vinylalcohol) solution prepared in Example 4 and 2.5 g of the butylidene polymer prepared in Example 3 were mixed together at ambient temperature to give a 10 wt % poly(vinylalcohol)/0.25 wt % butylidene polymer solution. This was diluted down to give a 2 wt % poly(vinyl alcohol)/0.05 wt % butylidene polymer solution. This solution was acidified to pH 1.5 with phosphoric acid and left to cure for 1 hour. After curing the solution was neutralised using 5M NaOH. This cured and neutralised solution was then further diluted to give a 1 wt % poly(vinylalcohol)/0.025 wt % butylidene polymer solution; and a 0.05 wt % polyvinylalcohol/0.0125 wt % butylidene polymer solutions.

On acidification of the polyvinylalcohol/butylidene polymer blend as described, the two polymers react as described in PCT/GB97/02529.

EXAMPLE 6

Protocol for Preparation of Oil Emulsions

Emulsions of oil and the aqueous formulations of Example 5 were prepared at ratios of oil: aqueous formulation of 70:30 and 60:40 with the aqueous phase containing 2 wt %, 1 wt % or 0.5 wt % poly(vinylalcohol). The oil and aqueous formulations were initially mixed using a spatula, then homogenized.

EXAMPLE 7

Protocol for Evaluation of Oil Emulsions

The viscosity against shear rate of the emulsions was measured on 0.65 ml samples at 25° C. taking 60 measuring points at 10 second intervals and a shear rate of 0.1 to 1000 s$^{-1}$ followed immediately by a rate of 1000 to 0.1 s$^{-1}$. Results are provided in FIG. 1 wherein:

Lines A and A$^1$ are comparative examples detailing the results for two runs undertaken without inclusion of an aqueous formulation of Example 4.

Lines B and B$^1$ are the results for two runs undertaken using the aqueous formulation of Example 5 with 2 wt % poly(vinylalcohol).

Lines C and C$^1$ are the results for two runs undertaken using the aqueous formulation of Example 5 with 1 wt % of poly(vinylalcohol).

Lines D and D$^1$ are the results for two runs undertaken using the aqueous formulation of Example 5 with 0.5 wt % of polyvinylalcohol.

FIG. 1 shows that without the addition of any formulation described in Example 5, the viscosity is relatively high. When the formulation is added, there is a significant reduction in viscosity.

Thus, the formulation may be dosed into a oil flow at any point at which it is desired to reduce the oil's viscosity to enable it to be transported. For example, it may be closed in at the bottom of a riser pipe to reduce the viscosity of oil flowing upwardly in the pipe. Alternatively, it may be closed in at or near the surface. Once closed in, the oil may be transported long distances through a pipeline to a refinery or other oil storage facility.

After completion of the transport stage, it is necessary to recover the oil from the emulsion. This may be achieved by allowing the mixture to settle; by mechanical means or by chemical means. An example of the latter may involve the addition of 0.1 to 0.3 wt % (preferably about 0.2 wt %) of a periodate salt (preferably the sodium salt) to the emulsion. This causes the destruction of the emulsion and enables the oil to be recovered for further processing.

EXAMPLE 8

Preparation of Glutaraldehyde/Poly(vinylalcohol) Formulation

A poly(vinylalcohol) solution of a 88% hydrolysed poly(vinylalcohol) having a molecular weight of about 160,000 is prepared by dissolving 87 g of the poly(vinylalcohol) in 1000 ml of water by stirring the components for 24 hours at 80-90° C. The solution is then allowed to cool to 50° C. and 1.29 ml of a 25% solution of glutaraldehyde added with stirring for about 1 hour. Then, 100 ml of 1M HCl is added with stirring and a gel forms which may be used as described above.

EXAMPLE 9

Preparation of Glyoxal/Poly(vinylalcohol) Formulation

By a process analogous to Example 8 a glyoxal cross-linked poly(vinylalcohol) may be prepared.

The materials of Examples 8 and 9 may be used in viscosity reduction as described herein.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for reducing the viscosity of a viscous composition which is arranged to flow along a fluid flow path, said method comprising contacting the viscous composition in said fluid flow path with a treatment fluid formulation, said treatment fluid formulation comprising a polymeric material AA which includes —O— moieties pendent from a polymeric backbone thereof, wherein said polymeric material AA comprises polyvinyl acetate which has been 60 to 95% hydrolyzed to polyvinyl alcohol, wherein polymeric material AA is optionally cross-linked and wherein said treatment fluid formulation is initially contacted with said viscous composition in said fluid flow path at or downstream of a producing face of a subterranean formation.

2. A method according to claim 1, wherein the viscosity of the viscous composition after contact with the treatment fluid formulation is less than 300 cP measured at 25° C. and 1000 $s^{-1}$.

3. A method according to claim 2, wherein the viscous composition, after contact with the treatment fluid formulation, exhibits shear thinning.

4. A method according to claim 1, wherein said viscous composition is an oil.

5. A method according to claim 1, wherein said fluid flow path is defined by a conduit means which includes a first conduit part which is arranged downstream of a production means.

6. A method according to claim 1, wherein said fluid flow path extends between a first point, remote from the point of production of the viscous composition, and a second point closer to the point of production of the viscous composition.

7. A method according to claim 1, wherein said fluid flow path is defined, in part, by a second conduit part which extends upwardly from below ground to above ground.

8. A method according to claim 1, wherein said treatment fluid formulation is arranged to disperse and/or emulsify said viscous composition on contact therewith.

9. A method according to claim 1, wherein flow is turbulent at the point of initial contact of said viscous composition with said treatment fluid formulation so that said composition is dispersed and/or emulsified on contact with said formulation.

10. A method according to claim 1, wherein a delivery flow path is defined which is arranged to communicate with said fluid flow path wherein said treatment fluid formulation is dosed into said viscous composition in said fluid flow path via said delivery flow path.

11. A method according to claim 10, wherein the ratio of the flow rate (in weight per unit time) of treatment fluid formulation in said delivery flow path to the flow rate (in the same units) of viscous composition in said fluid flow path is in the range 0.1 to 2.5.

12. A method according to claim 11, wherein the amount of water in the composition in said fluid flow path immediately after contact between said viscous composition and said treatment fluid formulation is less than 70 wt %.

13. A method according to claim 1, wherein said treatment fluid formulation has a viscosity at 25° C. and 1000 $s^{-1}$ of greater than 1 cP and not greater than 50 cP.

14. A method according to claim 1, wherein said treatment fluid formulation includes at least 70 wt % water.

15. A method according to claim 14, wherein said treatment fluid formulation includes at least 0.2 wt % and less than 10 wt % of said polymeric material AA.

16. A method according to claim 1, wherein said treatment fluid formulation includes 94.5 to 99.6 wt % water and 0.4 to 5.5 wt % of said polymeric material AA; and the ratio of the wt % of said treatment fluid formulation to the wt % of said viscous composition contacted in the method is in the range 0.4 to 0.9.

17. A method according to claim 1, wherein said polymeric material AA is wholly soluble in water at 25° C.

18. A method according to claim 1, wherein said polymeric backbone of said polymeric material AA includes carbon atoms which are part of —CH$_2$— moieties.

19. A method according to claim 2, wherein said polymeric backbone consists essentially of carbon atoms in the form of C—C single bonds.

20. A method according to claim 4, wherein said polymeric material AA includes, on average, at least 10 —O— moieties pendent from the polymeric backbone thereof.

21. A method according to claim 1, which involves selecting a said polymeric material AA; selecting a material BB which includes a functional group which is able to react in the presence of said polymeric material AA to cross-link polymeric material AA and form a polymeric material CC; and causing the formation of said polymeric material CC by a reaction involving said polymeric material AA and material BB.

22. A method according to claim 21, wherein material BB has a general formula:

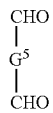

where $G^5$ represents a direct link or a linking moiety.

23. A method according to claim 21, wherein said material BB comprises:

(i) a first polymeric material having a repeat unit of formula

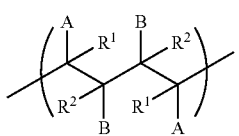

I wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) a first polymeric material prepared or preparable by providing a compound of general formula

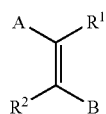

wherein A, B, $R^1$ and $R^2$ are as described above, in an aqueous solvent and causing the groups C═C in said compound to react with one another to form said first polymeric material.

24. A method according to claim 4, wherein after the viscous composition has been delivered to a desired location the viscous composition is caused to separate from other components of the treatment fluid formulation.

25. A method according to claim 24, wherein separation is achieved by reducing mixing or turbulent movement of the mixture and allowing the viscous composition to settle out from the water and optionally cross-linked polymeric material AA.

26. A method of reducing the viscosity of a viscous petroleum which is arranged to flow along a fluid flow path, said method comprising contacting the viscous petroleum with a treatment fluid formulation, wherein:

a delivery flow path is defined which is arranged to communicate with said fluid flow path, said treatment fluid formulation being dosed into said viscous petroleum in said fluid flow path via said delivery flow path;

the treatment fluid formulation is initially contacted with said viscous composition in said fluid flow path at or downstream of a producing face of a subterranean formation;

the ratio of the flow ratio (in weight per unit time) of treatment fluid formulation in said delivery flow path to the flow rate (in the same weight per unit time units) of viscous petroleum in said fluid flow path is in the range 0.1 to 2.5;

said treatment fluid formulation includes at least 90 wt % water and at least 0.2 wt % of a polymeric material AA;

said polymeric material AA comprises polyvinyl acetate which has been 60 to 100% hydrolyzed to polyvinyl alcohol.

27. A method according to claim 26, wherein:

said ratio of said flow rates is in the range 0.2 to 1;

said treatment fluid formulation includes at least 0.5 wt % and less than 5.5 wt % of said polymeric material AA.

28. A method according to claim 26, wherein immediately after contact between said viscous petroleum and said treatment fluid formulation, said fluid flow path contains a composition which includes 40 to 80 wt % of material derived from said viscous petroleum and 20 to 60 wt % of material derived from said treatment fluid formulation.

29. A method according to claim 28, wherein said polymeric material AA comprises polyvinylacetate which has been 60 to 95% hydrolysed to polyvinylalcohol.

30. A fluid flow path positioned at or downstream of a producing face of a subterranean formation, wherein said flow path contains a fluid comprising petroleum, water and a polymeric material AA which is a polyvinyl alcohol polymer or copolymer which is not cross-linked, wherein said polymeric material AA comprises polyvinyl acetate which has been 60-100% hydrolyzed to polyvinyl alcohol.

31. A fluid flow path according to claim 30, said fluid flow path containing a composition which includes 40 to 80 wt % of material derived from a viscous petroleum and 20 to 60 wt % of water.

32. A method for reducing the viscosity of a viscous composition which is arranged to flow along a fluid flow path, said method comprising contacting the viscous composition in said fluid flow path with a treatment fluid formulation, said treatment fluid formulation comprising a polymeric material AA which includes —O— moieties pendent from a polymeric backbone thereof, wherein said polymeric material AA comprises polyvinylacetate which has been 60 to 95% hydrolysed to polyvinylalcohol, wherein polymeric material AA is optionally cross-linked and wherein said treatment fluid formulation is initially contacted with said viscous composition in said fluid flow path at or downstream of a producing face of a subterranean formation.

* * * * *